United States Patent [19]
Kim

[11] Patent Number: 6,049,626
[45] Date of Patent: Apr. 11, 2000

[54] IMAGE ENHANCING METHOD AND CIRCUIT USING MEAN SEPARATE/ QUANTIZED MEAN SEPARATE HISTOGRAM EQUALIZATION AND COLOR COMPENSATION

[75] Inventor: Yeong-taeg Kim, Suwon, Rep. of Korea

[73] Assignee: Samsung Electronics Co., Ltd., Kyungki-Do, Rep. of Korea

[21] Appl. No.: 08/947,897

[22] Filed: Oct. 9, 1997

[30] Foreign Application Priority Data

Oct. 9, 1996 [KR] Rep. of Korea .................. 96-44918
Oct. 9, 1996 [KR] Rep. of Korea .................. 96-44920

[51] Int. Cl.[7] .................. G06K 9/00; G06K 9/40
[52] U.S. Cl. .................. 382/167; 382/168; 382/254; 382/274
[58] Field of Search .................. 382/162, 167, 382/168, 169, 254, 274, 173; 358/518, 520, 522, 661

[56] References Cited

U.S. PATENT DOCUMENTS 5,345,277 9/1994 Blankevoort .................. 348/679
5,857,033 1/1999 Kim .................. 382/168

*Primary Examiner*—Bijah Tadayon
*Assistant Examiner*—Dmitry A. Novick
*Attorney, Agent, or Firm*—Sughrue, Mion, Zinn Macpeak & Seas, PLLC

[57] ABSTRACT

In an image enhancement method and a circuit therefor, a luminance signal is extracted from input color signals. The luminance signal, extracted in screen units, is divided into subimages according to the mean value of the luminance signal. The gray level histograms of the divided subimages are independently equalized, and an adjusted luminance signal is output. The color signals are varied on the basis of the adjusted luminance signal, and compensated color signals are output. Accordingly, an abrupt variation in brightness and an artifact are effectively reduced, image contrast is enhanced, and an undistorted color signal is provided at the same time. Also, in order to reduce the hardware of the circuit, an input luminance image is quantized, the quantized image is divided into a predetermined number of quantized subimages on the basis of the mean of the quantized image, and an independent histogram equalization is performed on each of the quantized subimages.

24 Claims, 7 Drawing Sheets

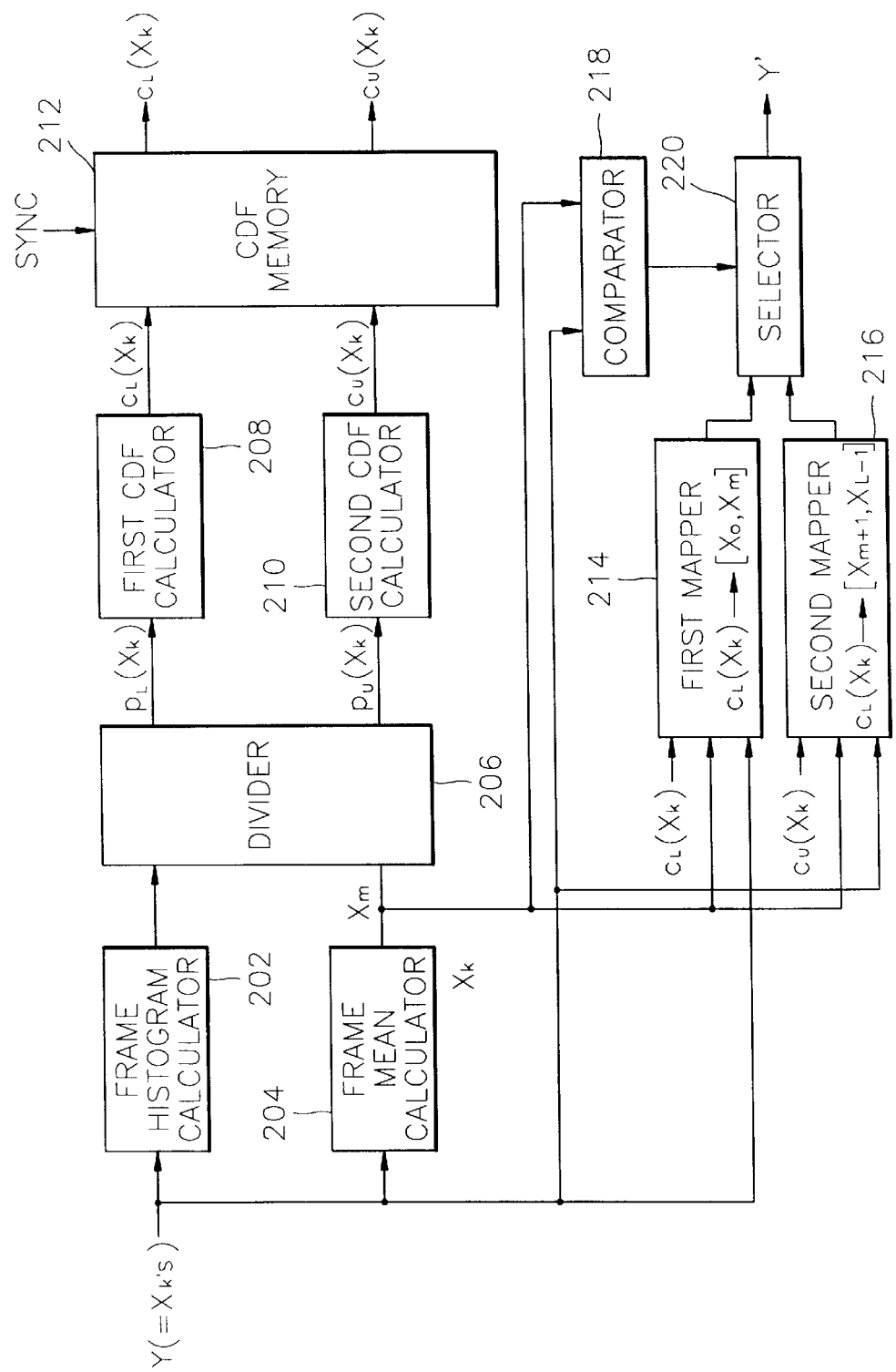

IMAGE ENHANCING METHOD AND CIRCUIT USING MEAN SEPARATE/ QUANTIZED MEAN SEPARATE HISTOGRAM EQUALIZATION AND COLOR COMPENSATION

BACKGROUND OF THE INVENTION

The present invention relates to image enhancement, and more particularly, to a method and circuit for enhancing the quality of an image by compensating a color signal in response to a luminance variation or adjustment due to mean separate histogram equalization and quantized mean separate histogram equalization.

The basic operation of histogram equalization is to transform a given input image on the basis of the histogram of the input image. Here, the histogram denotes a gray level distribution of a given input image. The histogram of a gray level provides an overall depiction of the appearance of an image. The gray level, appropriately controlled according to the sample distribution of an image, enhances the appearance or contrast thereof.

Histogram equalization uses a sample distribution of the image and is a widely-known contrast enhancement method. Histogram equalization has been disclosed in the following documents: [1] J. S. Lim, "Two-Dimensional Signal and Image Processing," Prentice Hall, Englewood Cliffs, N.J., 1990; and [2] R. C. Gonzalez and P. Wints, "Digital Image Processing," Addison-Wesley, Reading, Mass., 1977.

The well-known characteristics of histogram equalization becomes a defect in some actual cases. Since the output density of histogram equalization is constant, the mean brightness of an output image approaches a middle gray level. In practice, the mean brightness of the output image in histogram equalization is exactly the middle gray level regardless of the mean brightness of an input image. Obviously, this characteristics is not desirable for actual applications. For instance, a scene photographed at night appears extremely bright after histogram equalization.

Additionally, if color compensation is not performed on a color signal according to a luminance variation occurring when the above-described histogram equalization is performed, a pure color signal is distorted.

For example, consider that a color system is composed of Y, R-Y and B-Y signals, and assume that the Y signal is varied to a Y'(=Y+Δy) signal by a predetermined luminance processing technique. The varied color signal (Y',R-Y,B-Y) is varied to a value (R,G,B) without color compensation, and the resultant color signals are expressed by Equations (1) through (3):

$$R' = (R - Y) + Y' \quad (1)$$
$$= R + \Delta y$$

$$G' = (G - Y) + Y' \quad (2)$$
$$= G + \Delta y$$

$$B' = (B - Y) + Y' \quad (3)$$
$$= B + \Delta y$$

When Y is varied to Y', an exemplary pure red signal (R,0,0) is mapped to a signal (R+Δy,Δy,Δy) if there is no color compensation. Thus, the resultant color signal is no longer a pure red signal. Similarly, if there is no color compensation, all of the other pure color signals are also distorted.

Meanwhile, a contrast correction method, in which Y is extracted from input color signals R, G and B, and a correction signal is extracted from the extracted Y and added to each of the input signals R, G and B as shown in Equations (1) through (3), has been disclosed in the U.S. Pat. No. 5,345,277. However, this correction method could not solve the problem of distortion of a pure color signal.

SUMMARY OF THE INVENTION

It is an object of the present invention to provide a method for enhancing image quality by also varying a color signal based on an adjusted luminance, while enhancing image contrast by dividing a luminance image into a predetermined number of subimages based on the mean level of the luminance image and independently performing histogram equalization on the divided subimages.

It is another object of the present invention to provide a method for enhancing the image quality by varying the color signal based on the adjusted luminance, while enhancing image contrast by quantizing an input luminance image, dividing the quantized image into a predetermined number of quantized subimages based on the mean of the quantized image, and independently performing histogram equalization on each of the quantized subimages.

It is still another object of the present invention to provide a circuit for enhancing image quality by varying a color signal based on an adjusted luminance, while enhancing image contrast by dividing a luminance image into a predetermined number of subimages based on the mean of the luminance image and independently performing histogram equalization on the divided subimages.

It is yet another object of the present invention to provide a circuit for enhancing the image quality by varying the color signal based on the adjusted luminance, while enhancing image contrast by quantizing an input luminance image, dividing the quantized image into a predetermined number of quantized subimages based on the mean of the quantized image, and independently performing histogram equalization on each of the quantized subimages.

To accomplish the first object, there is provided an image enhancement method comprising the steps of: (a) extracting a luminance signal from input color signals; (b) dividing the extracted luminance signal into subimages based on the mean value of the extracted luminance signal, independently equalizing the gray level histograms of the divided subimages, and outputting an adjusted luminance signal; and (c) varying the input color signals based on the adjusted luminance signal, and outputting compensated color signals.

To accomplish the second object, in the adjusted luminance output step, the extracted luminance signal is quantized, the quantized image is divided into a predetermined number of quantized subimages, each of the quantized subimages is independently histogram-equalized, whereby the adjusted luminance signal is output.

To accomplish the third object, an extractor of an image enhancement circuit extracts a luminance signal from input color signals. A histogram equalizer divides the luminance signal based on a mean value of the luminance signal, independently equalizes histograms of divided subimages, and outputs an adjusted luminance signal. A color compensator varies the input color signals based on the adjusted luminance signal, and outputs compensated color signals.

To accomplish the fourth object, the histogram equalizer quantizes the extracted luminance signal, divides the quantized image into a predetermined number of quantized subimages based on a quantized mean level, independently equalizes a histogram of each of the quantized subimages, thereby outputting the adjusted luminance signal.

BRIEF DESCRIPTION OF THE DRAWINGS

The above objects and advantages of the present invention will become more apparent by describing in detail a preferred embodiment thereof with reference to the attached drawings in which:

FIG. 6 is a detailed block diagram of the mean separate histogram equalizer shown in FIG. 5;

DETAILED DESCRIPTION OF THE INVENTION

Figure 1:
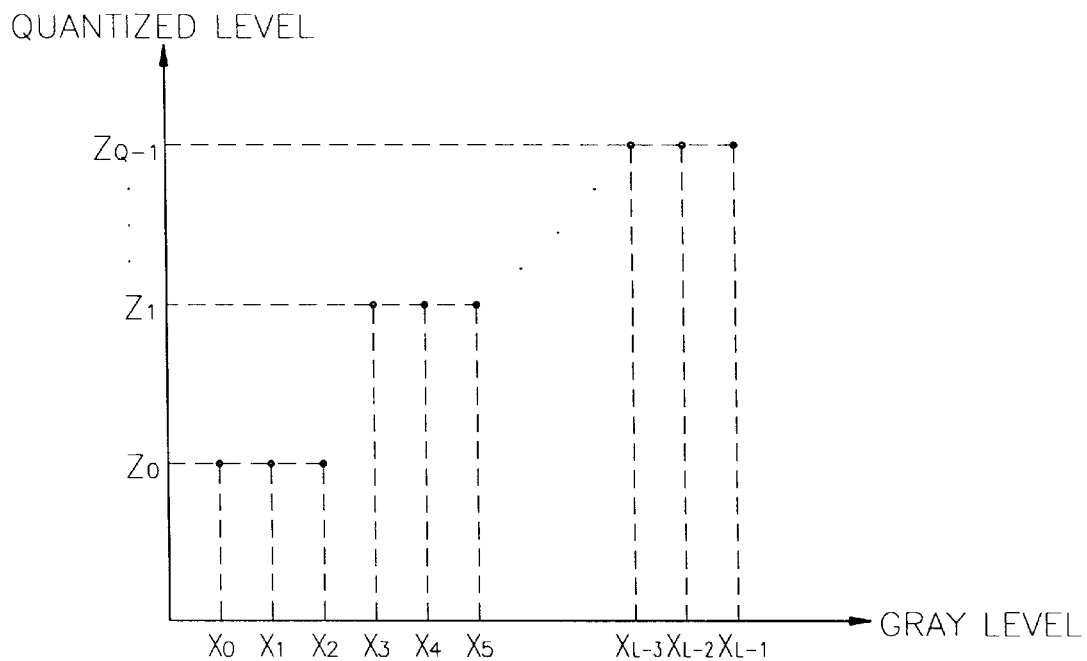
FIG. 1 shows an example of quantization of an L-level discrete signal to a Q-level discrete signal for explaining the concept of quantization.

Mean separate histogram equalization according to an embodiment of the present invention will be described.

$\{X\}$ denotes a given luminance image, and $X_m$ denotes the mean level of the given luminance image $\{X\}$. The luminance image is divided into two subimages defined as $\{X\}_L$ and $\{X\}_U$ based on the mean level $X_m$. All of samples in $\{X\}_L$ are smaller than or equal to the mean level $X_m$, and all of samples in $\{X\}_U$ are greater than the mean level $X_m$.

The given luminance image $\{X\}$ is composed of L discrete gray levels $\{X_0, X_1, \ldots X_{L-1}\}$. Here, $X_0=0$ denotes a black level, $X_{L-1}=1$ denotes a white level, and $X_m \in \{X_0, X_1, \ldots X_{L-1}\}$.

The respective probability density functions (PDF) of the divided subimages $\{X\}_L$ and $\{X\}_U$ are defined by Equations (4) and (5):

$$p_L(X_k) = \frac{n_k^L}{n_L}, \text{ for } k = 0, 1, \ldots, m \tag{4}$$

$$p_U(X_k) = \frac{n_k^U}{n_U}, \text{ for } k = m+1, m+2, \ldots, L-1 \tag{5}$$

where L is the number of levels, $p_L(X_k)$ is the probability of a k-th gray level $(X_k)$ in the subimage $\{X\}_L$, $p_U(X_k)$ is the probability of a k-th gray level $(X_k)$ in the subimage $\{X\}_U$, $n_k^L$ and $n_k^U$ denote the number of times in which the level $X_k$ appears in each sub image, and $n_L$ and $n_U$ denote the number of total samples in the subimages $\{X\}_L$ and $\{X\}_U$.

At this time, the cumulative density functions (CDF) of the sub images $\{X\}_L$ and $\{X\}_U$ are defined as follows:

$$c_L(X_k) = \sum_{j=0}^{k} p_L(X_j), \text{ for } k = 0, 1, 2, \ldots, m \tag{6}$$

$$c_U(X_k) = \sum_{j=0}^{k} p_U(X_j), \text{ for } k = m+1, m+2, \ldots, L-1 \tag{7}$$

On the basis of the cumulative density functions, the resultant output Y' after proposed mean separate histogram equalization will be given as follows:

$$Y' = \begin{cases} c_L(X_k) X_m & \text{if } X_k \le X_m \\ X_{m+1} + (X_{L-1} - X_{m+1}) c_U(X_k) & \text{if } X_k > X_m \end{cases} \tag{8}$$

This is the result of mapping the samples of $\{X\}_L$ to a gray level between $X_0$ to $X_m$ according to the CDF of mapping the samples of $\{X\}_U$ to a gray level between $X_{m+1}$ to $X_{L-1}$ according to the CDF. It can be recognized from the results that independent histogram equalization was made on each of the subimages.

When the number of gray levels L is infinite, and when the PDFs of an input image are symmetrical around the mean of the input image, the output mean of mean separate histogram equalization is given as $(0.5+X_m)/2$. By contrast, the output mean of general histogram equalization is given as 0.5. Unlike general histogram equalization, mean separate histogram equalization proposed by the present invention provides the mean value between the input mean and a middle gray level. In the general histogram equalization, the mean brightness of an output image is exactly the middle gray level regardless of the mean brightness of an input image, which causes a scene that is photographed at night to appear too bright after histogram equalization. Such a problem can be solved by mean separate histogram equalization proposed by the present invention.

Hereinafter, quantized mean separate histogram equalization according to an embodiment of the present invention will be described.

The original discrete input level $\{X_0, X_1, \ldots X_{L-1}\}$ is quantized to a Q discrete level defined as $\{Z_0, Z_1, \ldots Z_{Q-1}\}$. Here, it is assumed that $Z_{Q-1}$ is equal to $X_{L-1}$, Q is smaller than or equal to L, and $\{Z_0, Z_1, \ldots Z_{Q-1}\} \subset \{X_0, X_1, \ldots X_{L-1}\}$.

An example of the quantization of an L-level discrete signal to a Q-level discrete signal is shown in FIG. 1.

$Q[X_k]$ denotes a quantization operation, and is defined as follows.

$Q[X_k] = Z_q$, if $Z_{q-1} < X_k < Z_q$

When $\{Z\}$ is equal to $Q[\{x\}]$ and $Z_m$ is equal to $Q[X_m]$, $x_m$ is the mean level of the original luminance image, $\{Z\}$ is a quantized image, and $Z_m$ is a quantized mean level. The quantized image $\{Z\}$ is divided into two subimages $\{Z\}_L$ and $\{Z\}_U$ on the basis of $Z_m$. Here, every sample in the quantized subimage $\{Z\}_L$ is smaller than or equal to the quantized mean level $Z_m$, and every sample in the quantized subimage $\{Z\}_U$ is greater than the quantized mean level $Z_m$.

The quantized PDFs of the subimages $\{Z\}_L$ and $\{Z\}_U$ can be expressed by Equations (9) and (10):

$$P_L(Z_q) = \frac{N_q^L}{N_L}, \text{ for } Z_q \leq Z_m \tag{9}$$

$$P_U(Z_q) = \frac{N_q^U}{N_U}, \text{ for } Z_q > Z_m \tag{10}$$

where $P_L(Z_q)$ is the probability of a q-th quantized gray level $Z_q$ appearing in the quantized subimage $\{Z\}_L$, $P_U(Z_q)$ is the probability of a q-th quantized gray level $Z_q$ appearing in the quantized subimage $\{Z\}_U$, $N_q^L$ and $N_q^U$ denote the number of times in which the level $Z_q$ appears in the respective quantized subimages $\{Z\}_L$ and $\{Z\}_U$, and $N_L$ and $N_U$ denote the number of total samples in each of the quantized subimages $\{Z\}_L$ and $\{Z\}_U$.

At this time, the CDFs of the quantized subimages $\{Z\}_L$ and $\{Z\}_U$ are defined by Equations (11) and (12):

$$C_L(Z_q) = \sum_{j=0}^{q} P_L(Z_j), \text{ for } Z_q \leq Z_m \tag{11}$$

$$C_U(Z_q) = \sum_{j=0}^{q} P_U(Z_j), \text{ for } Z_q > Z_m \tag{12}$$

where $C_L(Z_m)$ is equal to 1 and $C_U(Z_{Q-1})$ is equal to 1.

Figure 2:
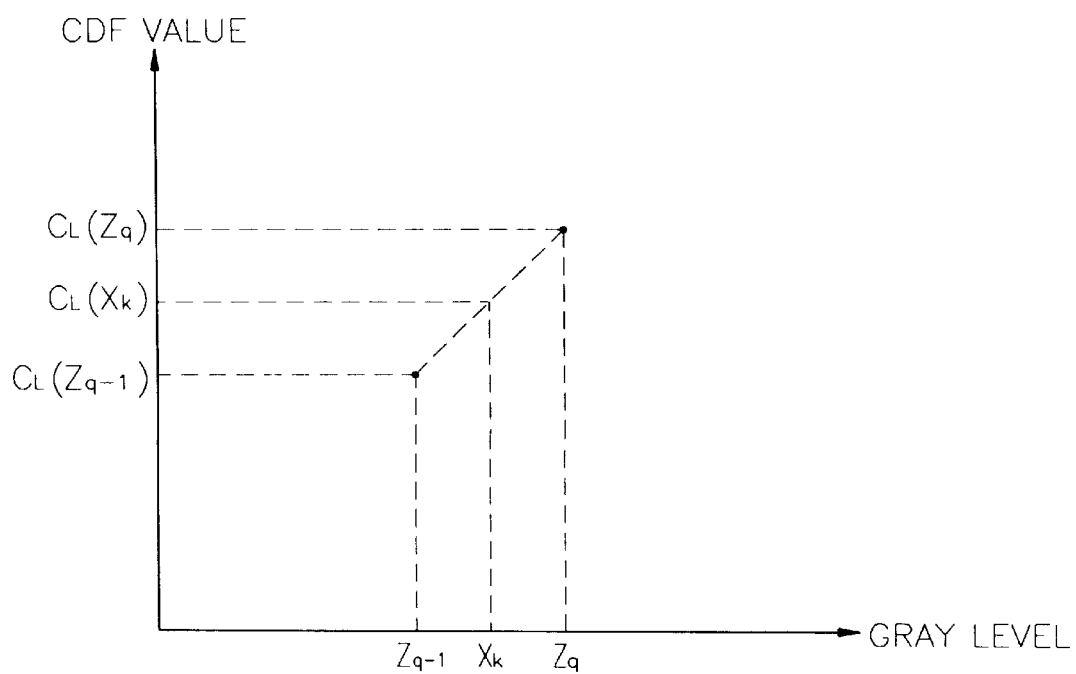
FIG. 2 is a view for explaining the concept of interpolation of a quantized cumulative density function.

Interpolated cumulative density functions $c_L(X_k)$ and $c_U(X_k)$ can be approximately calculated by linear interpolation shown in FIG. 2 from the quantized CDFs $C_L(Z_q)$ and $C_U(Z_q)$.

Assuming that $Q[X_k]$ is $Z_q \leq Z_m$, $Z_{-1}$ is equal to 0, and $c_L(X_k)$ is linearly interpolated as shown in Equation (13):

$$c_L(X_k) = C_L(Z_{q-1}) + [C_L(Z_q) - C_L(Z_{q-1})] X_k - \frac{Z_{q-1}}{Z_q - Z_{q-1}} \tag{13}$$

Similarly, assuming that $Q[X_k]$ is $Z_q > Z_m$, $C_U(X_k)$ is linearly interpolated as shown in Equation (14):

$$c_U(X_k) = C_U(Z_{q-1}) + [C_U(Z_q) - C_U(Z_{q-1})] X_k - \frac{Z_{q-1}}{Z_q - Z_{q-1}} \tag{14}$$

where $c_U(Z_m)$ is equal to 0.

Based on the interpolated CDFs, the resultant output Y' of proposed quantized mean separate histogram equalization is given as Equation (15):

$$Y' = \begin{cases} c_L(X_k) Z_m & \text{if } X_k \leq Z_m \\ Z'_m + (X_{L-1} - Z'_m) c_U(X_k), & \text{if } X_k > Z_m \end{cases} \tag{15}$$

where $Z_m'$ is $Z_m + X_{L-1}/(L-1)$.

Figure 3:
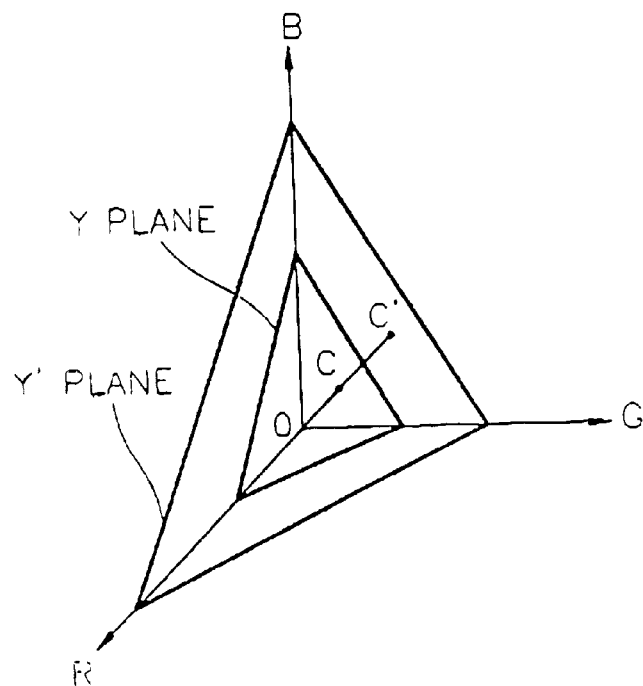
FIG. 3 is a view for explaining color compensation depending on a luminance variation.

Next, color compensation based on a luminance variation due to mean separate/quantized mean separate histogram equalization will be described with reference to FIGS. 3 and 4.

C is given as (R,G,B) and Y, and it is assumed that Y is varied to Y' by mean separate or quantized mean separate histogram equalization.

Here, color signals R, G and B can be converted to various color signals such as a color system (Y,I,Q), (Y,U,V) and (Y,R-Y,B-Y), according to a signal manner. The relationship between the color signals R, G and B and new color signals Y, U and V can be expressed by Equation (16):

$$\begin{bmatrix} Y \\ U \\ V \end{bmatrix} = \begin{bmatrix} a_{11} & a_{12} & a_{13} \\ a_{21} & a_{22} & a_{23} \\ a_{31} & a_{32} & a_{33} \end{bmatrix} \begin{bmatrix} R \\ G \\ B \end{bmatrix} \tag{16}$$

where $a_{ij}$ is a coefficient.

Meanwhile, the basic concept of color compensation according to the present invention is the fact that a given color is varied in the direction of the color in a space (R,G,B).

First, Y can be expressed by $a_{11}R + a_{12}G + a_{13}B$ as shown in Equation (16), and (R,G,B) having a constant Y value form a plane in the space (R,G,B). That is, every color signal, placed on the plane with Y being $a_{11}R + a_{12}G + a_{13}B$, has the identical luminance value. A variation of luminance from Y to Y' implies the movement of a given color C to a Y' plane as shown in FIG. 3. At this time, in the present invention, it is assumed that C and C' have the identical color directions, which means that a line OC accords with a line OC'. Thus, a compensated color C' on the Y' plane is obtained by searching for an intersection point between the line OC and the Y' plane. To sum up, the original color signal C shown in FIG. 3 is mapped to C' when the Y plane is placed on the Y' plane, which is an intersection point between the line OC and the Y' plane.

Now, in order to obtain C', (l,m,n) is defined as the directional cosine of a given color C, and expressed by Equation (17):

$$l = R/r, \ m = G/r, \ n = B/r \tag{17}$$

where r is equal to $$\sqrt{R^2 + G^2 + B^2}.$$

Similarly, the directional cosine (l',m',n') of the output color signal C'(=R',G',B') can be expressed by Equation (18).

$$l' = R'/r', \ m' = G'/r', \ n' = B'/r' \tag{18}$$

where r' is equal to $$\sqrt{R'^2 + G'^2 + B'^2}.$$

The two colors C and C' have an identical color direction by realizing the relationship shown in the following Equation (19) or (20):

$$l = l', \ m = m', \ n = n' \tag{19}$$

$$R'/r' = R/r, \ G'/r' = G/r, \ B'/r' = B/r \tag{20}$$

Accordingly, when the relationships given by Equations (21), (22) and (23) are substituted in $Y' = a_{11}R' + a_{12}G' + a_{13}B'$, Y' is expressed by Equation (24).

$$R' = \frac{r'}{r}R \quad (21)$$

$$G' = \frac{r'}{r}G \quad (22)$$

$$B' = \frac{r'}{r}B \quad (23)$$

$$Y' = a_{11}\frac{r'}{r}R + a_{12}\frac{r'}{r}G + a_{13}\frac{r'}{r}B \quad (24)$$

$$= \frac{r'}{r}(aR + bG + cB)$$

$$= \frac{r'}{r}Y$$

Therefore, Equation (25) is obtained.

$$\frac{Y'}{Y} = \frac{r'}{r} \quad (25)$$

Equation (25) means that the ratio of a luminance variation is the same as that of a color variation. Thus, in the present invention, color compensation is performed by varying a color value according to the luminance variation.

Meanwhile, Equations (21) through (23) can be expressed by following Equations (26) through (28) using the result of Equation (25).

$$R' = \frac{Y'}{Y}R \quad (26)$$

$$G' = \frac{Y'}{Y}G \quad (27)$$

$$B' = \frac{Y'}{Y}B \quad (28)$$

Consequently, C' can be obtained as follows:

$$\begin{aligned} C' &= (R', G', B') \\ &= (kR, kG, kB) \end{aligned} \quad (29)$$

where k is equal to Y'/Y. The k denotes the ratio between the original luminance signal and the resultant luminance signal.

Color compensation of other color systems can be also easily performed using the result of Equation (29). That is, for example, a given signal (Y,U,V) should be converted into (kY,kU,kV) as shown in Equations (30) and (31) using the result of the color compensation given by Equation (29).

$$\begin{aligned} U' &= a_{21}R' + a_{22}G' + a_{23}B' \\ &= k(a_{21}R + a_{22}G + a_{23}B) \\ &= kU \end{aligned} \quad (30)$$

$$\begin{aligned} V' &= a_{31}R' + a_{32}G' + a_{33}B' \\ &= k(a_{31}R + a_{32}G + a_{33}B) \\ &= kV \end{aligned} \quad (31)$$

As a further feature of the invention, a mechanism to prevent color saturation generated by the above-described color compensation.

Figure 4:
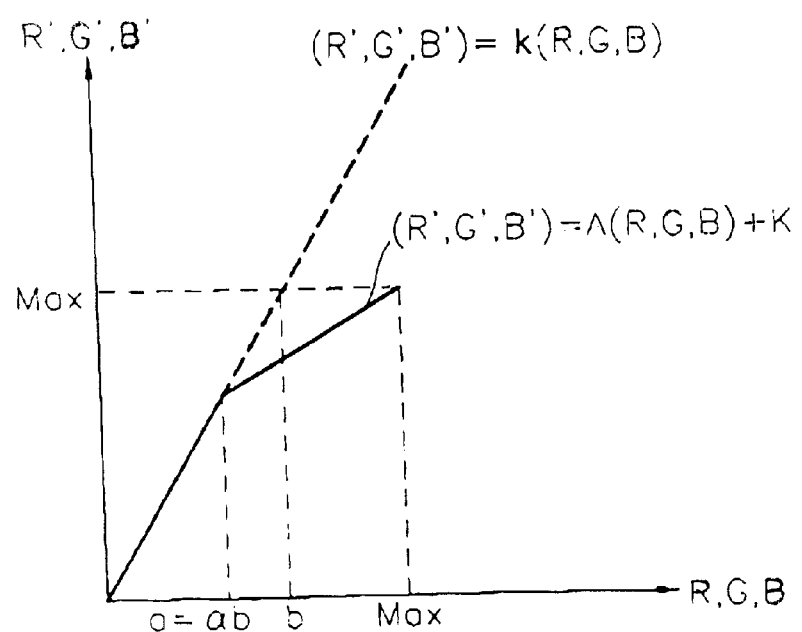
FIG. 4 is a view for showing a color compensation line for preventing color saturation.

When the luminance ratio is given as k, and when color compensation is performed by the compensation line (R', G',B')=k(R,G,B) shown in FIG. 4, color signals between a b(=Max/k) level and a maximum (Max) level are compensated to a maximum (Max) value, which implies saturation of the color signal. This results from the fact that when the color signals between the b level and the maximum (Max) level are compensated by the aforementioned compensation method, the color signals are consequently mapped to the maximum (Max) value and are not discriminated from each other.

In order to prevent the color saturation, a compensation line (R',G',B')=k(R,G,B) approximates a compensation line (R',G',B')=A(R,G,B)+K, for the color signals between an a(=αb) level and the maximum (Max) level of a color signal. Here, a is greater than or equal to 0 and smaller than or equal to 1, and A and K can be expressed by Equations (32) and (33):

$$A = \frac{k(1-\alpha)}{k-1} \quad (32)$$

$$K = \frac{(k-1)\alpha}{k-1}\text{Max} \quad (33)$$

Hereinafter, preferred embodiments of an image enhancement circuit using mean separate/quantized mean separate histogram equalization and color compensation, according to the present invention, will be described with reference to FIGS. 5 through 12.

Figure 5:
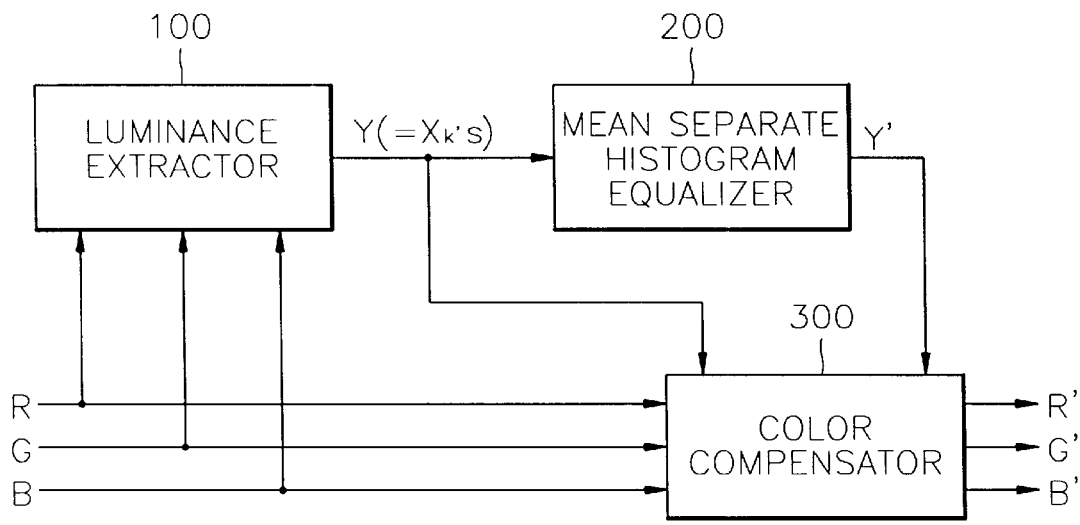
FIG. 5 is a block diagram of an image enhancement circuit according to a first embodiment of the present invention.

FIG. 5 is a block diagram of an image enhancement circuit according to a first embodiment of the present invention. Referring to FIG. 5, a luminance extractor 100 extracts a luminance signal Y from signals R, G and B. Here, the luminance extractor can comprise a matrix circuit.

A mean separate histogram equalizer 200 divides the Y signal extracted by the luminance extractor 100 into two separate groups based on its mean value, independently equalizes the histograms of the divided subimages, and then outputs a varied luminance signal Y'. A color compensator 300 outputs compensated color signals R',G' and B' by multiplying the ratio k between the luminance signal Y output by the luminance extractor 100 and the varied luminance signal Y' output by the mean separate histogram equalizer 200 with each of the input color signals R, G and B.

FIG. 6 is a detailed block diagram of the mean separate histogram equalizer 200 shown in FIG. 5. Referring to FIG. 6, a frame histogram calculator 202 calculates a histogram of the luminance image (Y=$X_k$'S) input in one screen units. That is, the frame histogram calculator 202 calculates a gray level distribution of the luminance image. A field can also be the screen unit, but in this embodiment, a frame is the screen unit.

A frame mean calculator 204 calculates the mean level $X_m$ of the luminance image (Y=$X_k$'S) in one frame units. A divider 206 divides the gray level distribution, calculated by the frame histogram calculator 202, into a predetermined number of subimages on the basis of the mean level $X_m$ calculated by the frame mean calculator 204, and outputs the probability density functions (PDFS) $p_L(X_k)$ and $p_U(X_k)$ of the two subimages. Two subimages are used in the present example but additional subimages maybe divided out based on other characteristics of the input luminance. The probability density functions $p_L(X_k)$ and $P_U(X_k)$ can be obtained by Equations (4) and (5).

A first CDF calculator 208 receives the PDF $p_L(X_k)$ of a first subimage, having image samples smaller than or equal to the mean level $X_m$, output by the divider 206, and calculates a cumulative density function (CDF) $c_L(X_k)$ using Equation (6). A second CDF calculator 210 receives the PDF $p_U(X_k)$ of a second subimage, having image samples greater than the mean level $X_m$, output by the divider 206, and calculates a CDF $c_U(X_k)$ using Equation (7).

A CDF memory 212 renews the CDF values $c_L(X_k)$ and $c_U(X_k)$ calculated by the first and second CDF calculators 208 and 210 in frame units according to a synchronous signal SYNC. The memory 212 provides the respective CDF values $c_L(X_k)$ and $c_U(X_k)$ of a previously stored frame, to first and second mappers 214 and 216 during renewal. Here, when the screen unit is a field, the synchronous signal is a field synchronous signal. When the screen unit is a frame, the synchronous signal is a frame synchronous signal. The CDF memory 212 is used as a buffer.

The first mapper 214 receives the CDF value $c_L(X_k)$, calculated by the first CDF calculator 208 and output via the CDF memory 212, the input luminance signal $X_k$, and the mean level $X_m$ calculated by the frame mean calculator 204. Mapper 214 maps each input luminance signal $X_k$ which is smaller than or equal to the mean level $X_m$ to a gray level according to the corresponding CDF value $c_L(X_k)$, and outputs a contrast-enhanced signal, i.e., an adjusted luminance signal Y'. Accordingly, the samples of the first subimage $\{X\}_L$ are mapped to a gray level between $X_0$ and $X_m$ using Equation (8).

The second mapper 216 receives the CDF value $c_U(X_k)$, calculated by the second CDF calculator 210 and output via the CDF memory 212, the input luminance signal $X_k$, and the mean level $X_m$ calculated by the frame mean calculator 204. Mapper 216 maps each input luminance signal $X_k$ which is greater than the mean level $X_m$ to a gray level according to the corresponding CDF value $c_U(X_k)$, and outputs a contrast-enhanced signal, i.e., an adjusted luminance signal Y'. Accordingly, the samples of the second subimage $\{X\}_U$ are mapped to a gray level between $X_{m-1}$ and $X_{L-1}$, using Equation (8).

At this time, the luminance signal $X_k$, input to the first and second mappers 214 and 216, is a luminance signal having a frame next to the frames corresponding to the CDF values output by the CDF memory 212. In order to input a luminance signal having the same frame as that of the CDF values output by the CDF memory 212 to the first and second mappers 214 and 216, a frame memory for delaying an input luminance signal by one frame can be further provided. However, in the present invention, the frame memory can be omitted due to the fact that a high correlation exits between adjacent frames, thereby reducing the hardware necessary for the system.

A comparator 218 compares the input luminance signal $X_k$ with the mean level $X_m$ output by the frame mean calculator 204, and generates a selection control signal. A selector 220 selects the first mapper 214 when the input luminance signal $X_k$ is smaller than or equal to the mean level $X_m$; otherwise, selects the second mapper 216.

Here, instead of separately using the frame histogram calculator 202 and the CDF calculators 208 and 210, the CDF calculators 208 and 210 can calculate the CDFs on the basis of gray level distributions of the divided subimages, without the frame histogram calculator 202.

Figure 7:
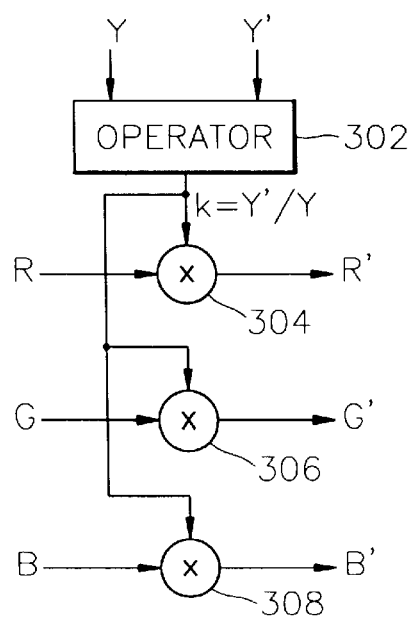
FIG. 7 is a detailed circuit diagram of the color compensator shown in FIG. 5.

FIG. 7 is a detailed circuit diagram of the color compensator 300 shown in FIG. 5. Referring to FIG. 7, an operator 302 produces Y'/Y, i.e., the ratio k between the Y signal output by the luminance extractor 100 of FIG. 5 and the Y' signal output by the mean separate histogram equalizer 200. Here, the operator can be a divider. First through third multipliers 304 through 308 multiply the ratio k, output by the operator 302, with each of the input signals R, G and B, and output compensated signals R', G' and B', respectively.

Figure 8:
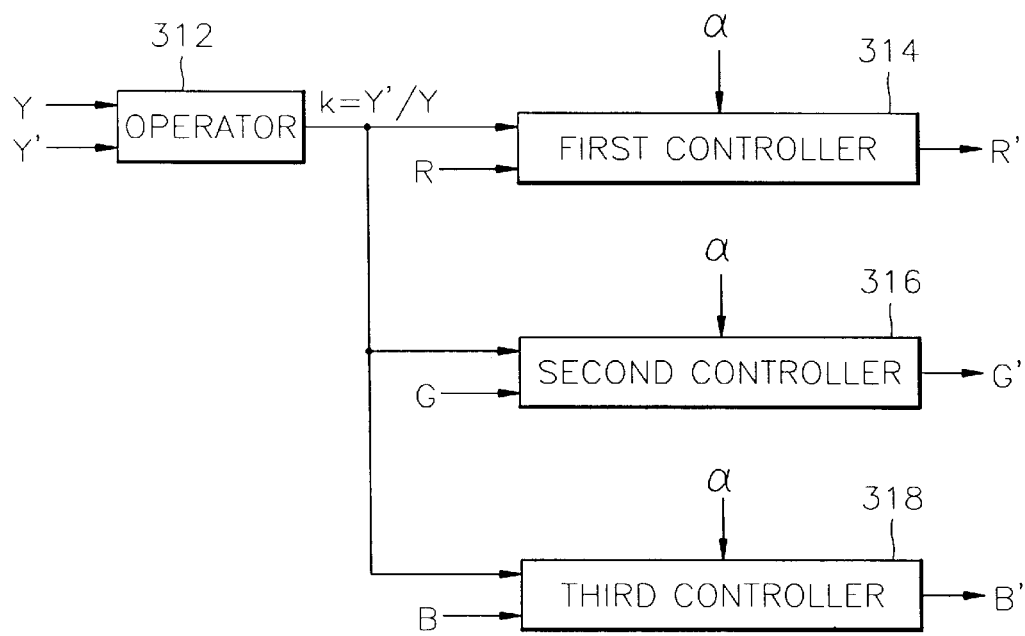
FIG. 8 is another detailed circuit diagram of the color compensator shown in FIG. 5.

FIG. 8 is another detailed circuit diagram of the color compensator 300 shown in FIG. 5. Referring to FIG. 8, an operator 312 produces Y'/Y, i.e., the ratio k between the Y signal output by the luminance extractor 100 of FIG. 5 and the Y' signal output by the mean separate histogram equalizer 200.

First through third controllers 314 through 318 are for preventing color saturation by compensating input signals R, G and B using the approximated compensation line shown in FIG. 4. The first controller 314 receives the input signal R, the ratio k output by the operator 312, and a parameter a, and outputs a signal R' compensated by a compensation line (R',G',B')=k(R,G,B) when the input signal R is between a minimum level and an a(=αb) level as shown in FIG. 4. On the other hand, when the input signal R is between the a level and a maximum (Max) level, the first controller 314 outputs a signal R' compensated by a compensation line (R',G',B')= A(R,G,B)+K.

At this time, the input signals can be selectively compensated by the compensation line (R',G',B')=k(R,G,B) or by the approximated compensation line (R',G',B')=A(R,G,B)+ K, according to the value of the parameter α. That is, when α equals 1, the input signals R, G and B are compensated by the compensation line (R',G',B')=k(R,G,B). When α equals 0, the input signals R, G and B are compensated by the compensation line (R',G',B')=A(R,G,B)+K. When α is greater than 0 and smaller than 1, the input signals R, G and B are compensated by the compensation line (R',G',B')=k (R,G,B), between the minimum level and the a(=αb) level, and compensated by the approximated compensation line (R',G',B')=A(R,G,B)+K, between the a level and the maximum (Max) level.

The second controller 316 receives the input signal G, the ratio k output by the operator 312, and a parameter α, and outputs a signal G' compensated by the compensation line (R',G',B')=k(R,G,B) when the input signal G is between the minimum level and the a(=αb) level as shown in FIG. 4. On the other hand, when the input signal G is between the a level and the maximum (Max) level, the second controller 316 outputs a signal G' compensated by the approximated compensation line (R',G',B')=A(R,G,B)+K.

The third controller 318 receives the input signal B, the ratio k output by the operator 312, and a parameter α, and outputs a signal B' compensated by the compensation line (R',G',B')=k(R,G,B) when the input signal G is between the minimum level and the a(=αb) level as shown in FIG. 4. On the other hand, when the input signal B is between the a level and the maximum (Max) level, the third controller 318 outputs a signal B' compensated by the approximated compensation line (R',G',B')=A(R,G,B)+K.

Figure 9:
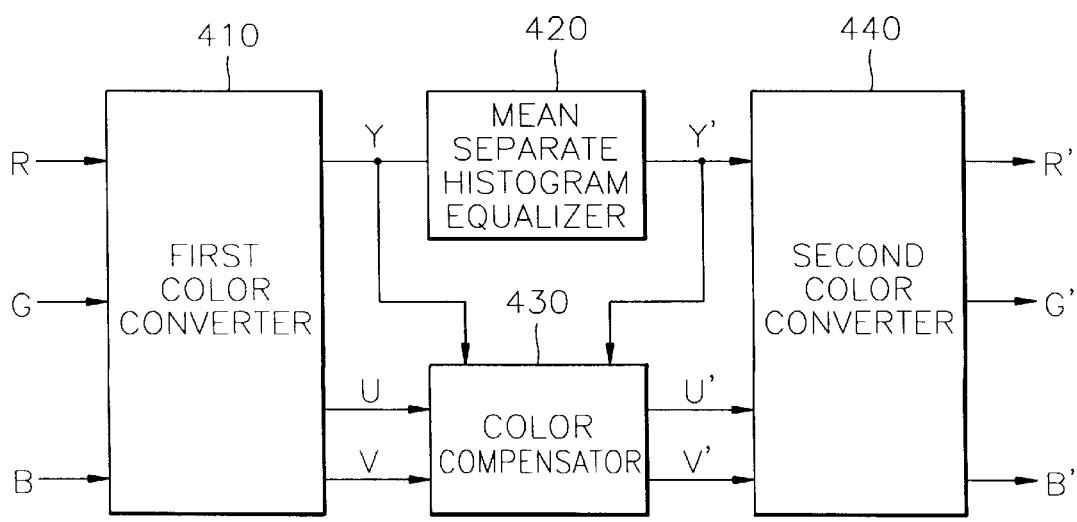
FIG. 9 is a block diagram of an image enhancement circuit according to a second embodiment of the present invention.

FIG. 9 is a block diagram of an image enhancement circuit according to a second embodiment of the present invention. Referring to FIG. 9, a first color converter 410 receives baseband digital color signals R, G and B, and converts the received signals into a digital luminance signal Y and system-defined color signals U and V.

Here, the signals R, G and B can be converted into various different color signals such as color systems (Y,I,Q), (Y,U,V) and (Y,R-Y,B-Y), according to a signal manner. For example, in the present invention, (Y,U,V) is used as a color system, Y represents a luminance signal, and U and V represent system-defined color signals. The relationship between the signals R, G and B and new color signals Y, U and V can be expressed by Equation (16).

A mean separate histogram equalizer 420 divides the luminance signal Y, output by the first color converter 410, into two separate groups based on the mean value of the luminance signal Y, independently equalizes the histograms of the divided subimages, and outputs a varied luminance signal Y'. Here, the detailed configuration of the mean separate histogram equalizer 420 is the same as that shown in FIG. 6.

A color compensator 430 receives the luminance signal Y output by the first color converter 410 and the varied luminance signal Y' output by the mean separate histogram equalizer 420, varies the color signals U and V output by the first color converter 410 at the same ratio as that of the variation of the luminance signal, and outputs compensated system-defined color signals U' and V'. Here, the color compensator 430 can output the compensated system-defined color signals U' and V' using the configurations shown in FIGS. 7 and 8.

A second color converter 440 receives the varied luminance signal Y' output by the mean separate histogram equalizer 420 and the compensated system-defined color signals U' and V' output by the color compensator 430, performs an inverse-conversion opposite to the conversion performed by the first color converter 410, and outputs resultant color signals R', G' and B'. That is, the resultant color signals R', G' and B' are obtained by inversely-converting the signals (Y',U',V') into color systems (R,G,B) according to the relationship shown in the Equation (34).

$$\begin{bmatrix} R' \\ G' \\ B' \end{bmatrix} = \begin{bmatrix} a_{11} & a_{12} & a_{13} \\ a_{21} & a_{22} & a_{23} \\ a_{31} & a_{32} & a_{33} \end{bmatrix} \begin{bmatrix} Y' \\ U' \\ V' \end{bmatrix} \quad (34)$$

Figure 10:
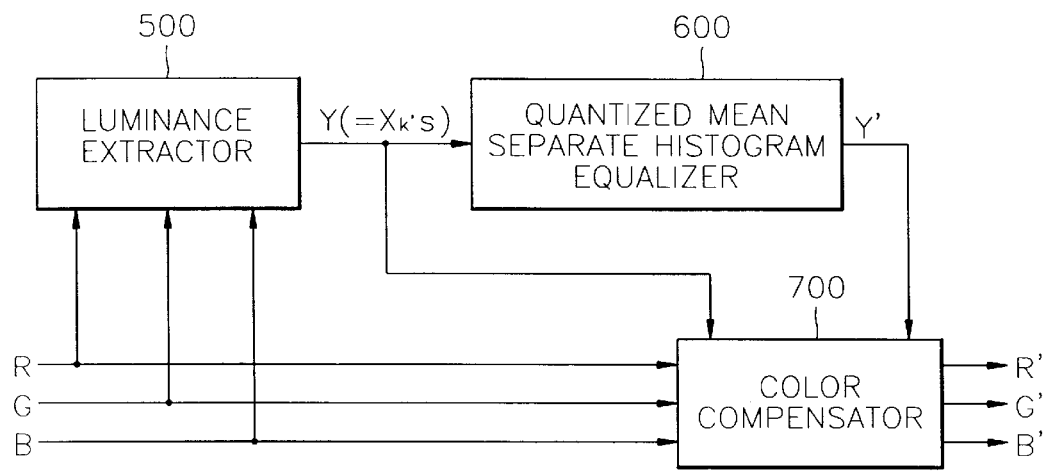
FIG. 10 is a block diagram of an image enhancement circuit according to a third embodiment of the present invention.

FIG. 10 is a block diagram of an image enhancement circuit according to a third embodiment of the present invention. Referring to FIG. 10, a luminance extractor 500 extracts a luminance signal Y from input signals R, G and B. A quantized mean separate histogram equalizer 600 quantizes the Y signal extracted by the luminance extractor 500, divides the quantized signal into a predetermined number of quantized subimages based on the mean of the quantized signal, performs an independent histogram equalization in each of the quantized subimages, and outputs a varied luminance signal Y'. A color compensator 700 multiplies each of the input signal R, G and B by the ratio k between the luminance signal Y output by the luminance extractor 500 and the varied luminance signal Y' output by the quantized mean separate histogram equalizer 600, and outputs compensated color signals R',G' and B'.

Figure 11:
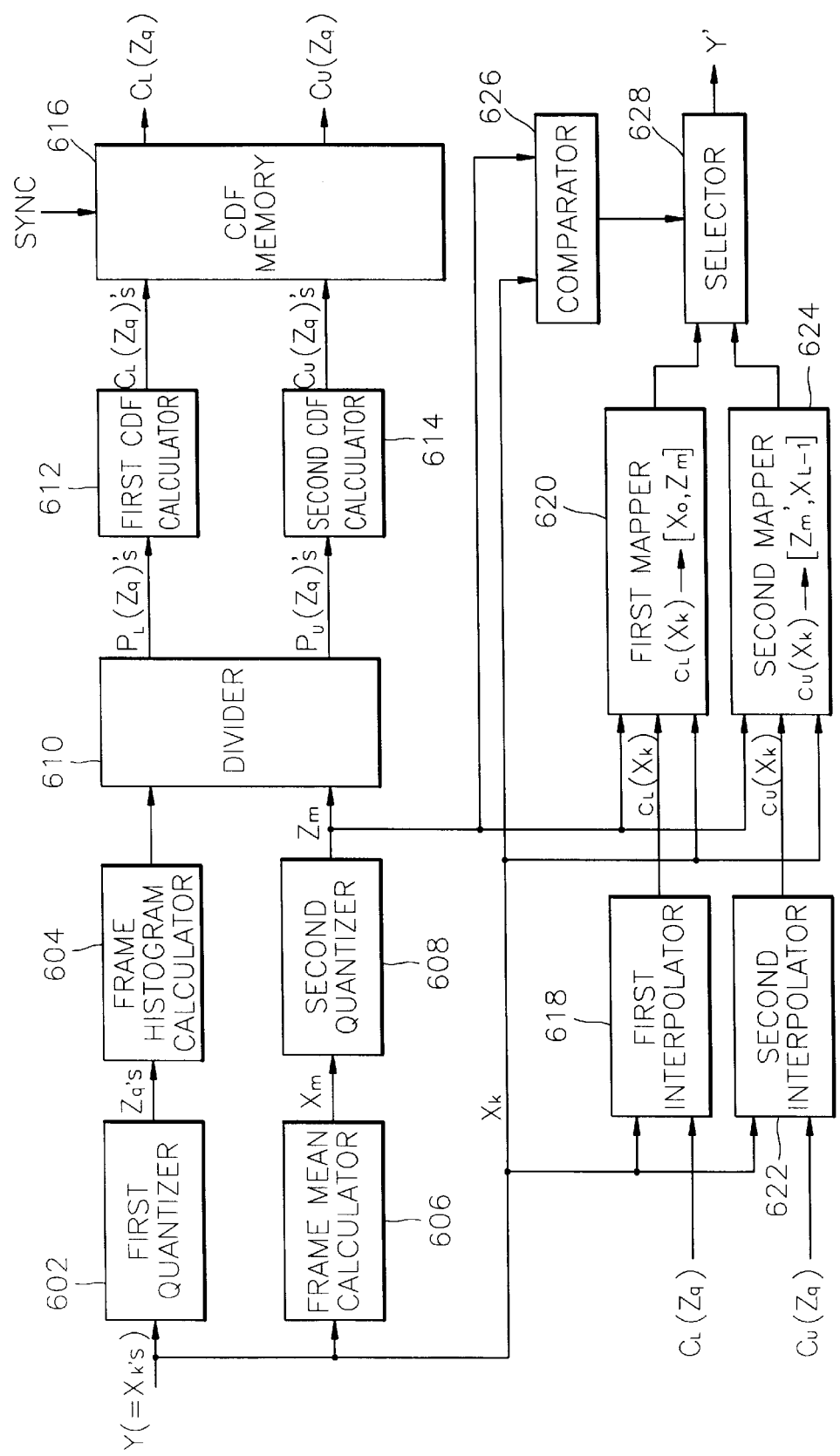
FIG. 11 is a detailed block diagram of the quantized mean separate histogram equalizer shown in FIG. 10.

FIG. 11 is a detailed block diagram of the quantized mean separate histogram equalizer 600 shown in FIG. 10. Referring to FIG. 11, a first quantizer 602 quantizes an input luminance image ($Y=X_k$'s) of L discrete levels into Q discrete levels, and outputs a quantized image $Z_q$'s. A frame histogram calculator 604 calculates a gray level distribution of the quantized image $Z_q$'s in frame units. A frame mean calculator 606 calculates a mean level $X_m$ of the input luminance image ($Y=X_k$'S) in frame units. A second quantizer 608 quantizes the mean level $X_m$ of the luminance image, and outputs a quantized mean level $Z_m$. A divider 610 divides the quantized gray level distribution, calculated by the frame histogram calculator 604, into a predetermined number (here, two) of quantized subimages $\{Z\}_L$ and $\{Z\}_U$ based on the quantized mean level $Z_m$ output by the second quantizer 608, and outputs the PDFs $P_L(Z_q)$'s and $P_U(Z_q)$'s of the quantized subimages $\{Z\}_L$ and $\{Z\}_U$. The quantized PDFs $P_L(Z_q)$'s and $P_U(Z_q)$'s can be calculated by Equations (9) and (10). Here, every sample in the quantized subimage $\{Z\}_L$ is smaller than or equal to the quantized mean level $Z_m$, and every sample in the quantized subimage $\{Z\}_U$ is greater than the quantized mean level ($Z_m$).

A first CDF calculator 612 calculates a cumulative density function $C_L(Z_q)$'s of the quantized subimage $\{Z\}_L$ on the basis of the probability density function $P_L(Z_q)$'s of the quantized subimage $\{Z\}_L$, which is smaller than or equal to the quantized mean level $Z_m$, output by the divider 610, using Equation (11).

A second CDF calculator 614 calculates a cumulative density function $C_U(Z_q)$'s of the quantized subimage $\{Z\}_U$ on the basis of the probability density function $P_U(Z_q)$'s of the quantized subimage $\{Z\}_U$, which is greater than the quantized mean level $Z_m$. output by the divider 610, using Equation 12.

A CDF memory 616 renews the cumulative density functions $C_L(Z_q)$'s and $C_U(Z_q)$'s of the quantized subimages $\{Z\}_L$ and $\{Z\}_U$ calculated by the first and second CDF calculators 612 and 614, according to a synchronous signal SYNC in frame units. The memory 616 provides cumulative density function values $C_L(Z_q)$ and $C_U(Z_q)$, stored during renewal, to the first and second interpolators 618 and 622. Here, the synchronous signal SYNC is a field synchronous signal when a field is the screen unit, and the synchronous signal SYNC is a frame synchronous signal when a frame is the screen unit. The CDF memory 616 is used as a buffer.

A first interpolator 618 performs a linear interpolation on the basis of the cumulative density function value $C_L(Z_q)$ of the quantized subimage $\{Z\}_L$ using Equation (13), and outputs an interpolated cumulative density function value $C_L(X_k)$. Here, k is an integer ranging between 0 and m. A first mapper 620 receives the interpolated cumulative density function value $c_L(X_k)$, the input luminance signal $X_k$ and the quantized mean level $Z_m$, Mapper 620 maps the samples of the subimage $\{Z\}_L$, which are smaller than or equal to the quantized mean level $Z_m$, to a gray level between $X_0$ and $Z_m$ according to the interpolated cumulative density function value $c_L(X_k)$.

A second interpolator 622 performs a linear interpolation on the basis of the cumulative density function value $C_U(Z_q)$ of the quantized subimage $\{Z\}_U$ using Equation (14), and outputs an interpolated cumulative density function value $c_U(X_k)$. Here, k is an integer ranging between m+1 and L−1. A second mapper 624 receives the interpolated cumulative density function value $c_U(X_k)$, the input luminance signal $X_k$ and the quantized mean level $Z_m$. Mapper 624 maps the samples of the subimage $\{Z\}_U$, which are greater than the quantized mean level $Z_m$, to a gray level between $Z_m'$ and $X_{L-1}$ according to the interpolated cumulative density function value $c_U(X_k)$. Here, $Z_m'$ is equal to $Z_m+X_{L+1}/(L-1)$.

The luminance signal $X_k$ input to the first and second interpolators 618 and 622 is a luminance signal having a frame next to that of the cumulative density function values $C_L(Z_q)$ and $C_U(Z_q)$ output by the CDF memory 616. In order to input a luminance signal having the same frame as $C_L(Z_q)$ and $Cu(Z_q)$, a frame memory for delaying an input luminance signal can be provided. However, the present invention is able to omit the frame memory using the fact that a high correlation exists between adjacent frames.

A comparator 626 compares the input luminance signal $X_k$ with the quantized mean level $Z_m$ output by the second quantizer 608, and generates a selection control signal. A selector 628 selects the first mapper 620 when the input luminance signal $X_k$ is smaller than or equal to the quantized mean level $Z_m$ according to the selection control signal, and otherwise, selects the second mapper 624. Then, the selector 628 outputs a contrast-enhanced signal, which can be expressed by Equation (15), i.e., a varied luminance signal Y'.

Also, instead of separately using the frame histogram calculator 604 and the CDF calculators 612 and 614, the CDF calculators 612 and 614 can calculate the CDF on the basis of the gray level distribution of the divided quantized image signals, without the frame histogram calculator 604.

Figure 12:
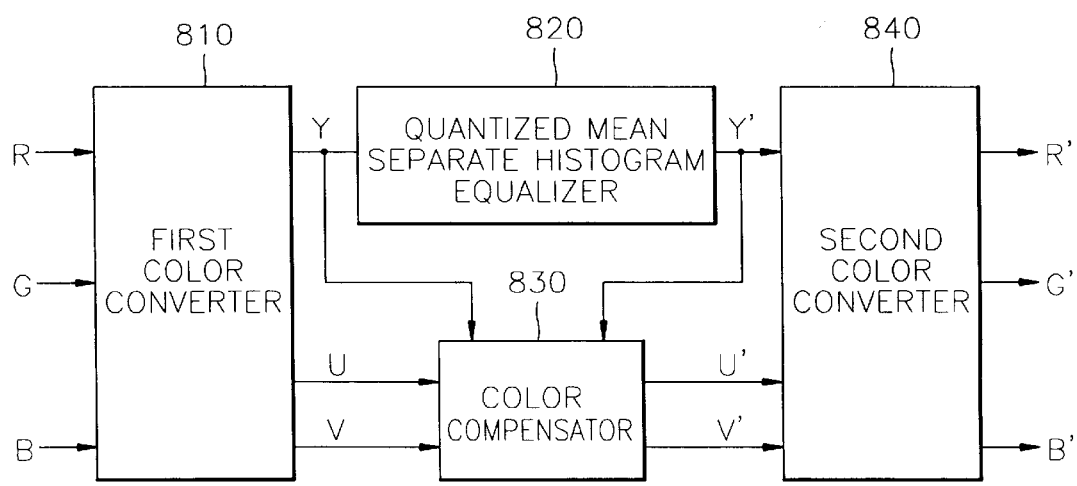
FIG. 12 is a block diagram of an image enhancement circuit according to a fourth embodiment of the present invention.

FIG. 12 is a block diagram of an image enhancement circuit according to a fourth embodiment of the present invention. Referring to FIG. 12, a first color converter 810 receives baseband digital color signals R, G and B, and converts the received signals into a digital luminance signal Y and system-defined color signals U and V.

A quantized mean separate histogram equalizer 820 quantizes the luminance signal Y output by the first color converter 810, divides the quantized signal into a predetermined number of quantized subimages on the basis of the mean of the quantized signal, performs an independent histogram equalization with respect to each quantized subimage, and outputs a varied luminance signal Y'. Here, the detailed configuration of the quantized mean separate histogram equalizer 820 is the same as that shown in FIG. 11.

A color compensator 830 receives the luminance signal Y output by the first color converter 810 and the varied luminance signal Y' output by the quantized mean separate histogram equalizer 820, varies the color signals U and V, output by the first color converter 810, at the same ratio as that of the variation of the luminance signal, and outputs compensated system-defined color signals U' and V'. Here, the color compensator 830 can output the compensated system-defined color signals U' and V' using the configurations shown in FIGS. 7 and 8.

A second color converter 840 receives the varied luminance signal Y' output by the quantized mean separate histogram equalizer 820 and the compensated system-defined color signals U' and V' output by the color compensator 830, performs inverse-conversion opposite to the conversion made by the first color converter 810, and outputs resultant color signals R', G' and B'.

As described above, the present invention is applicable to a wide-ranging field associated with image enhancement of an image signal, i.e., broadcasting apparatus, radar signal processing, medical engineering, home appliances, etc.

The present invention can provide an undistorted color signal while improving image contrast by effectively reducing an abrupt variation in brightness and an artifact.

Also, the circuit according to the present invention stores and accumulates only the number of times of the appearance of the quantized gray level, so that its hardware is simplified and its cost is thus reduced.

What is claimed is:

1. An image enhancement method comprising the steps of:
   (a) extracting a luminance signal from input color signals;
   (b) dividing said extracted luminance signal into subimages based on a mean value of said extracted luminance signal, independently equalizing gray level histograms of said subimages and outputting an adjusted luminance signal; and
   (c) varying said input color signals based on said adjusted luminance signal, and outputting compensated color signals.

2. An image enhancement method as claimed in claim 1, wherein said compensated color signals are varied in a direction identical to that of said input color signals.

3. An image enhancement method as claimed in claim 1, wherein said adjusted luminance signal forms an adjusted luminance plane in a space of said input color signals, and wherein the luminance values of all color signals on said adjusted luminance plane are the same.

4. An image enhancement method as claimed in claim 3, wherein said compensated color signals are obtained by an intersection point between a) a compensation line, said compensation line being extended in a direction of a line of said input color signals, and b) said adjusted luminance plane.

5. An image enhancement method as claimed in claim 4, wherein when a ratio between said extracted luminance signal and said adjusted luminance signal is expressed as a factor of k, and said compensation line is given as follows:

$$(R',G',B')=k(R,G,B),$$

where (R',G', B') represent said compensated color signals and (R, G, B) represent said input color signals.

6. An image enhancement method as claimed in claim 4, wherein when a ratio between said extracted luminance signal and said adjusted luminance signal is given as k, said compensation line is given as follows:

$$(R',G',B')=A(R,G,B)+K,$$

where (R',G', B') represent said color compensated signals and (R, G, B) represent said input color signals;
where A is equal to $$\frac{k(1-\alpha)}{k-1},$$

K is equal to $$\frac{(k-1)\alpha}{k-1}\text{Max},$$

α is greater than or equal to 0 and smaller than or equal to 1, and Max is a maximum value for a color signal.

7. An image enhancement method as claimed in claim 1, wherein said step (b) comprises the steps of:
   (b1) calculating said mean value of said extracted luminance signal, said extracted luminance signal being provided in screen units;
   (b2) calculating a cumulative density function of each subimage divided according to said mean value and a gray level distribution of said extracted luminance signal; and
   (b3) mapping said extracted luminance signal to a new gray level in each subimage based on said cumulative density function of each subimage, and outputting said adjusted luminance signal.

8. An image enhancement method as claimed in claim 7, wherein, in said step (b2), said extracted luminance signal is divided into two subimages according to said mean value.

9. An image enhancement method as claimed in claim 1, wherein said step (b) comprises the steps of:
   (b1) quantizing a level of said extracted luminance signal and outputting a quantized signal;
   (b2) calculating a mean of a gray level distribution of said extracted luminance signal, said extracted luminance signal being provided in screen units, quantizing said calculated mean, and outputting a quantized mean level;
   (b3) dividing said quantized signal into a predetermined number of quantized subimages, according to said quantized mean level;

(b4) calculating a cumulative density function value of each quantized subimage based on said quantized mean level and gray level distribution of said quantized signal;

(b5) performing an interpolation according to said cumulative density function value of each quantized subimage, and outputting an interpolated cumulative density function value of each quantized subimage; and (b6) performing an independent histogram equalization of each quantized subimage based on said interpolated cumulative density function value of each quantized subimage, and outputting said adjusted luminance signal.

10. An image enhancement method as claimed in claim 9, wherein, in said step (b3), said quantized signal is divided into two subimages according to said quantized mean level.

11. An image enhancement method as claimed in claim 9, wherein said interpolation in said step (b5) is a linear interpolation.

12. An image enhancement circuit comprising:

extracting means for extracting a luminance signal from input color signals;

histogram equalization means for dividing said luminance signal into subimages based on a mean value of said extracted luminance signal, independently equalizing gray level histograms of said subimages, and outputting an adjusted luminance signal; and color compensation means for varying said input color signals based on said adjusted luminance signal, and outputting compensated color signals.

13. An image enhancement circuit as claimed in claim 12, wherein said color compensation means comprises:

an operator for producing a ratio between said extracted luminance signal and said adjusted luminance signal; and a plurality of multipliers for multiplying each input color signal by the ratio output by said operator and outputting said compensated color signals.

14. An image enhancement circuit as claimed in claim 12, wherein said color compensation means comprises:

an operator for producing a ratio between said extracted luminance signal and said adjusted luminance signal; and a plurality of controllers for receiving the ratio output by said operator and a parameter ($\alpha$), each of said plurality of controllers varying a respective input color signal using a color compensation line based on a value of said parameter, and outputting said compensated color signals.

15. An image enhancement circuit as claimed in claim 14, wherein when the ratio between said extracted luminance signal and said adjusted luminance signal is expressed as a factor of k, said compensation line is given as follows:

$$(R',G',B')=k(R,G,B),$$

where (R',G',B') represent said compensated color signals and (R, G, B) represent said input color signals.

16. An image enhancement circuit as claimed in claim 14, wherein, when the ratio between said extracted luminance signal and said adjusted luminance signal is expressed as a factor of k, said compensation line is given as follows:

$$(R',G',B')=A(R,G,B)+K,$$

where (R',G', B') represent said compensated color signals and (R, G, B) represent said input color signals where A is equal to $$\frac{k(1-\alpha)}{k-1},$$

K is equal to $$\frac{(k-1)\alpha}{k-1}\text{Max},$$

$\alpha$ is greater than or equal to 0 and smaller than or equal to 1, and Max is a maximum value of a color signal.

17. An image enhancement circuit as claimed in claim 12, wherein said histogram equalization means comprises:

first calculating means for calculating said mean value of said extracted luminance signal, said extracted luminance signal being provided in screen units;

second calculating means for calculating a cumulative density function for each subimage based on a gray level distribution of a predetermined number of said subimages divided from said extracted luminance signal according to said mean value; and mapping means for mapping said extracted luminance signal to new gray levels according to said cumulative density function of each subimage, and outputting said adjusted luminance signal.

18. An image enhancement circuit as claimed in claim 17, wherein said second calculating means comprises:

a frame histogram calculator for calculating a gray level distribution of said extracted luminance signal;

a divider for dividing said gray level distribution into a predetermined number of subimages according to said mean value; and a plurality of cumulative density function calculators for calculating a cumulative density function of each subimage based on said mean value and said gray level distribution of said divided subimages.

19. An image enhancement circuit as claimed in claim 17, further comprising:

a screen memory for delaying said extracted luminance signal to input a luminance signal, having the same frame as that of said cumulative density function calculated by said second calculating means, to said mapping means; and a buffer for renewing said cumulative density function, calculated by said second calculating means, in screen units, and providing a cumulative density function value previously stored during renewal, to said mapping means.

20. An image enhancement circuit as claimed in claim 17, wherein said mapping means comprises:

a first mapper for mapping said extracted luminance signal to a first range of gray levels according to a cumulative density function value corresponding to when said extracted luminance signal is a first subimage smaller than or equal to said mean value;

a second mapper for mapping said extracted luminance signal to a second range of gray levels according to a cumulative density function value corresponding to when said extracted luminance signal is a second subimage greater than said mean value;

a comparator for comparing said extracted luminance signal with said mean value and generating a selection control signal; and a selector for selecting said first mapper when said extracted luminance signal is the first subimage, and otherwise, selecting said second mapper according to said selection control signal.

21. An image enhancement circuit as claimed in claim 12, wherein said histogram equalizing means comprises:

first quantization means for quantizing a level of said extracted luminance signal and outputting a quantized signal;

first calculating means for calculating said mean value of said extracted luminance signal input in screen units;

second quantizing means for quantizing said mean value and outputting a quantized mean level;

second calculating means for calculating a cumulative density function of each quantized subimage divided from said quantized signal based on a gray level distribution of a predetermined number of said quantized subimages divided according to said quantized mean level;

interpolating means for interpolating a cumulative density function value of each quantized subimage, and outputting an interpolated cumulative density function value of each subimage; and mapping means for mapping said extracted luminance signal to a gray level according to said interpolated cumulative density function value of each quantized subimage, and outputting said adjusted luminance signal.

22. An image enhancement circuit as claimed in claim 21, wherein said second calculating means comprises:

frame histogram calculator for calculating said gray level distribution of said quantized signal;

a divider for dividing said gray level distribution into a predetermined number of quantized subimages according to said quantized mean level; and a plurality of cumulative density function calculators for calculating a cumulative density function of each quantized subimage based on said quantized mean level and said gray level distribution of said quantized subimages.

23. An image enhancement circuit as claimed in claim 21, further comprising:

a screen memory for delaying said extracted luminance signal to input a luminance signal, having the same frame as that of said cumulative density function calculated by said second calculating means, to said interpolating means, and outputting a delayed signal; and a buffer for renewing a cumulative density function value of each quantized subimage, calculated by said second calculating means and providing said cumulative density function value, previously stored during renewal, to said interpolating means.

24. An image enhancement circuit as claimed in claim 21, wherein said mapping means comprises:

a first mapper for mapping said extracted luminance signal to a first range of gray levels according to an interpolated cumulative density function value corresponding to when said extracted luminance signal is a first subimage smaller than or equal to said quantized mean level;

a second mapper for mapping said extracted luminance signal to a second range of gray levels according to an interpolated cumulative density function value corresponding to when said extracted luminance signal is a second subimage greater than said quantized mean level;

a comparator for comparing said extracted luminance signal with said quantized mean level and generating a selection control signal; and a selector for selecting said first mapper when said extracted luminance signal is the first subimage, and otherwise, selecting said second mapper according to said selection control signal.

* * * * *